Patented June 10, 1930

1,763,417

UNITED STATES PATENT OFFICE

EDWARD JOHN CLARKE, OF CHARING CROSS, ENGLAND, ASSIGNOR TO ALLOY WELDING PROCESSES LIMITED, OF CHARING CROSS, ENGLAND, A BRITISH COMPANY

ELECTRODE FOR ELECTRIC WELDING OR SOLDERING

No Drawing. Application filed February 15, 1928, Serial No. 254,621, and in Great Britain March 29, 1927.

This invention relates to metallic electrodes for use in electric welding or soldering, the metal of the electrode being deposited upon the work by the arc. The chief object of the invention is to effect the arc welding or soldering of aluminium or aluminium alloys other than aluminium bronze in which latter the maximum of aluminium present does not exceed 20 per cent, and usually ranges from about 2 to 10 per cent, and it is to be understood that throughout the present specification and claims the term "aluminium" is hereinafter used to denote both pure aluminium and also aluminium alloys of which the main constituent is aluminium in a proportion amounting to at least 50 per cent; this has hitherto been regarded as impracticable owing to the rapid oxidation of the molten metal and its tendency to break up into globules instead of uniting with the solid metal of the work. Also the oxide, which is of a difficultly fusible nature, if allowed to form spreads over the work as a white layer for several inches around the arc.

According to this invention the electrode comprises a core of aluminium, in the form of a wire, rod or strip, on which is a coating of flux of sufficient thickness to confine the arc substantially to the crater formed, in which flux is included sufficient of a strong reducing agent, such as carbon or carbonaceous material, to form a reducing atmosphere around the arc so that the metal is deposited without coming into contact with any free oxygen or oxygenating compound. An electrode made in accordance with this invention allows the aluminium to deposit as a coherent metal, without oxidation of the molten material as it is deposited on the work. An especially suitable carbonaceous material comprises sawdust. The flux must also be of a type capable of flowing over the surface of the deposited metal to protect it from the action of the atmosphere.

The flux may be made from ordinary fluxing ingredients, such as alkali chlorides, fluorides, borates, bisulphates and other fusible compounds, to which is added the necessary proportion of the carbon, sawdust, charcoal or carbonaceous materials. The ingredients are preferably first ground together in a fine powder and then made into a smooth paste by the addition of water, or, for a harder setting mixture water with some dextrine or other agglutinant. The paste is applied to the aluminium core in any convenient manner and then dried. The method described in the specification of English Patent No. 127,315 (E. H. Jones) may be utilized for the purpose of producing an even coherent layer.

Examples of the ingredients of electrode coatings which have been found suitable for carrying out the present invention are as follows, although it will be understood that the nature and proportions of the ingredients can be varied considerably.

Example 1

| | Per cent |
|---|---|
| Potassium chloride | 40 |
| Lithium chloride | 5 |
| Sodium chloride | 30 |
| Potassium bisulphate | 10 |
| Potassium fluoride | 10 |
| Powdered charcoal | 5 |

Example 2

| | Per cent |
|---|---|
| Potassium fluoride | 24 |
| Barium chloride | 24 |
| Potassium chloride | 37 |
| Potassium bisulphate | 11 |
| Charcoal | 4 |

Example 3

| | Per cent |
|---|---|
| Potassium fluoride | 24 |
| Barium chloride | 24 |
| Potassium chloride | 37 |
| Potassium bisulphate | 12 |
| Charcoal or sawdust | 3 |

Example 4

| | Parts |
|---|---|
| Potassium fluoride | 50 |
| Potassium chloride | 50 |
| Charcoal | 5 to 15 |

Example 5

|  | Parts |
|---|---|
| Potassium fluoride | 50 |
| Potassium chloride | 50 |
| Sawdust | 10 to 20 |

The aluminium core may be coated electrolytically, by dipping, or otherwise with a layer of metal, for example, copper or nickel, which it is desired to alloy with the aluminium or to assist in preventing the formation of aluminium oxide, whilst a metal or metals, such as silicon, copper or nickel may also be added to the coating for the same purpose.

What I claim and desire to secure by Letters Patent of the United States is:—

1. An electrode for the arc welding or soldering of aluminium comprising a core of aluminium on which is a coating of flux of sufficient thickness to confine the arc substantially to the crater formed, said flux coating comprising as its ingredients 30 to 60 parts potassium fluoride, 30 to 60 parts potassium chloride and 3 to 20 parts of carbonaceous material.

2. An electrode for the arc welding or soldering of aluminium comprising a core of aluminium on which is a coating of flux of sufficient thickness to confine the arc substantially to the crater formed, said flux coating comprising as its ingredients 30 to 60 parts potassium fluoride, 30 to 60 parts potassium chloride and 3 to 20 parts of sawdust.

EDWARD JOHN CLARKE.